Patented Sept. 3, 1940

2,213,787

UNITED STATES PATENT OFFICE 2,213,787

PROCESS FOR THE RECOVERY OF ELEMENTARY SULPHUR FROM SULPHUR DIOXIDE AND GASES CONTAINING SAME

Conway Baron von Girsewald, Gerhard Roesner, and Josef Barwasser, Frankfort-on-the-Main, Germany, assignors to American Lurgi Corporation, New York, N. Y., a corporation of New York No Drawing. Application July 23, 1937, Serial No. 155,340. In Germany August 10, 1936

2 Claims. (Cl. 23—226)

It is already known that sulphur dioxide as such or in gases containing the same can be reduced to elemental sulphur by incandescent carbon.

Care is taken to proceed in such a manner that an oxidation of the carbon either to carbon dioxide or to the carbon monoxide through the preliminary formation of $CO_2$ occurs.

The latter method is distinguished by the fact that the sulphur dioxide or gas containing the same is exposed to the action of excess carbon at high temperatures above 1100° C., for instance temperatures up to 1400°, during a time sufficient to contrast the $CO_2$ formed first into CO. In contrast with this, the method directed to the most thorough possible conversion of the oxygen present into $CO_2$ requires only a short contact of the gas with carbon heated only to temperatures below 1100°, for instance down to 600°.

The method mentioned first involves the disadvantage in comparison with the second method that there is a much greater consumption of carbon, on the one hand due to the combining of a whole atom of carbon with each atom of oxygen in the form of carbon monoxide in comparison with the combining of only half this amount of carbon in carbon dioxide and on the other hand due to the higher absolute temperature required and the consumption of heat in the endothermic reaction $CO_2+C=2CO$. It involves the further drawback of conversion of considerable portions of the elemental sulphur formed first into undesirable by-products containing sulphur such as $CS_2$ and especially COS, due to the prolonged action of the carbon on the sulphur vapor contained in the gases.

Working under conditions for the greatest possible reduction of the oxygen present to carbon dioxide involves the disadvantage, however, that it is necessary to conduct the gas through a layer of the carbon with only very slight thickness and with comparatively great speed, in order to shorten down the duration of the contact with the carbon as much as possible. The result of this is that a uniform conversion of all the quantity of gas supplied cannot be produced since all variations in the interstices between the separate pieces of carbon must have increasing effect with increasing shortness of the path of the gas. In working with thin layers of carbon therefore it cannot be avoided that the main amount of the gas passes through the layer of carbon at a certain few places of the cross-section of the carbon with much greater speed than at other places. The most important drawback of working with the thin layers of carbon necessary for the preponderant formation of $CO_2$ is found, however, in the circumstance that in practice the thickness of the fuel layer cannot be kept constant, and fluctuates constantly due to burning down and periodical refilling with fresh carbon, these being relatively very important with the small thickness of the fuel layer necessitated by the working method mentioned. With gas speed remaining uniform this results in correspondingly considerable fluctuations of the composition of the gases escaping from the reduction furnace, since in these gases, alternately there will be present unreduced $SO_2$, when the thickness of the carbon layer is very greatly reduced and more CO or by-products containing sulphur, such as COS, when the thickness of the carbon layer is great.

Economical execution of the reduction process is excluded due to unavoidable losses of sulphur dioxide and other compounds containing sulphur since it is of course not possible, to suit the gas speed exactly continuously to the unavoidable change in the thickness of the carbon layer.

This holds true likewise for the process described in British Patent No. 406,343 according to which the duration of the action of the sulphur dioxide or gas containing the same on the reducing carbon is made so short that the gas, after passing through the layer of carbon, contains an excess sulphur dioxide not yet reduced, in addition to a certain limited amount of the by-products containing sulphur, and this gas is then subjected to a subsequent treatment at a moderately increased temperature of about 600° C. in the presence of catalysts, such as bauxite, whereby both the by-products containing sulphur and the carbon monoxide present enter into reaction with the sulphur dioxide still present in the waste gases from the reducing furnace and/or the sulphur dioxide supplied to them in addition from outside, with conversion of all the sulphur present to elemental sulphur.

Even in working according to this process, considerable difficulties are met with due to the aforementioned fluctuations of the composition of the gas emerging from the layer of carbon because of the change between the burning down and refilling of the thin layer of coal, since it is necessary, for a complete conversion of the sulphur present in the treated gas in the form of $SO_2$ into the elemental form during subsequent treatment of the gas, that the amount of the sulphur dioxide remaining in the exhaust gases from the reduction process or supplied to it in addition before the subsequent treatment shall be in a very definite ratio to the amount and nature of the by-products such as COS and CO contained at that time in the exhaust gases from the reduction process. Consequently the practical execution of this process is dependent entirely on the possibility of continuous production of a waste gas with entirely uniform content of CO and $SO_2$ and by-products containing sulphur, since otherwise it is not possible in practical operation to supply to the gases always exactly the amount of $SO_2$ necessary for the complete conversion of the substances containing sulphur included in the same to elemental sulphur. Naturally the amount of sulphur dioxide supplied cannot be suited constantly to the continual changes in the composition of the waste gases from the reduction process caused by the continuous change in the thickness of the layer of carbon in the reduction furnace. With this method therefore it is necessary to allow comparatively large amounts of sulphur to be lost continuously in the exhaust gases from the subsequent treatment in the form of $SO_2$ or COS, and this in especially high degree when treating gases with varying content of sulphur dioxide, whereby the unavoidable fluctuations in the composition of the final gas from the reduction process is increased still more.

In contrast to the aforementioned process involving the drawbacks mentioned, and directed either to the greatest possible conversion of the carbon to carbon dioxide or to the greatest possible formation of carbon monoxide, the process according to the present invention is based on the principles of selecting the working conditions during reduction of $SO_2$ or gases containing the same so that a condition is afforded in the generator employed, that is midway between the aforementioned working methods in that, on the one hand, those temperature conditions are avoided with which the conversion proceeds with preponderant formation of carbon monoxide, and the sulphur formed first thereby is exposed to conversion to disturbing by-products due to the lengthy effect of excess carbon, and on the other hand, with such moderate gas speeds that $SO_2$ is no longer contained in the waste gas. Fuel layers are used with a thickness that so much exceeds the slight thickness required for forming only carbon dioxide that drawbacks connected with the use of slight thicknesses of layer are avoided and above all disturbances of the aforementioned type due to the fluctuations of the fuel thickness by the continual burning down and refilling with fuel cannot make their appearance.

It has unexpectedly been found that in this way the reducing process may be so conducted that, without noteworthy formation of other sulphur-containing by-products, the proportion of COS plus CO in the outgoing gas of said process to the quantity of carbon dioxide formed constantly maintains the same value independently of the inevitable variations in the height of the layer of fuel, the absolute amount of said value in the individual case being dependent upon other working conditions involved, for example upon the $SO_2$ content of the gas treated.

The process of the present invention accordingly involves the simultaneous application of the following measures.

Passing the gas through a shaft furnace charged with coal, coke or other solid carbonaceous reducing agent and operated after the manner of a producer without external heating, while using a layer of fuel of such a depth and so regulating the rate of flow of the gas in the layer of fuel, that the gas issuing from the latter practically contains no more $SO_2$ and the temperature of the gas at its point of issue from the fuel does not attain 800° C.

Experiments have shown that this result can be attained especially easily when the depth of the layer of fuel used amounts to not less than 35 centimeters and preferably at least 50 centimeters; for instance, 90 centimeters and more.

In consequence of the invariable proportion—practically not affected by the inevitable variations in the height of the layer of fuel—between the total quantity of the COS and CO present in the outgoing gas of the reducing process and the $CO_2$ present, in accordance with the formula:

$$\frac{COS+CO}{CO_2}$$

it is possible, in accordance with the invention, to cause the COS and CO contained in the outgoing gas to react completely, through the constant uniform addition of the quantity of $SO_2$ corresponding to the quantity thereof, during the subsequent catalytic treatment of the gas in accordance with the equations:

$$2COS+SO_2=3S+2CO_2$$
$$2CO+SO_2=S+2CO_2$$

while the whole of the sulphur present in the gas mixture and added thereto is converted into the elementary form.

Instead of mixing the $SO_2$ needed for the subsequent treatment of the outgoing gas of the reducing process before its introduction into the chamber intended for said treatment, it is also possible to introduce it wholly or partially into the secondary treatment chamber at the same time as said gas but at different points therefrom. The $SO_2$ may be added as such, for example as it can be extracted in practically pure form from an initial gas containing $SO_2$ by one of the known concentration processes, for example by means of an absorption process, or also in the form of a gas containing $SO_2$, for example a roasting process gas.

Although gases having only a small $SO_2$ content, for example roasting process gases, may also be successfully treated in the foregoing manner, it will generally be preferred to use gases having a higher $SO_2$ content, such as can be obtained, for example, by the concentration of the $SO_2$ content of gases poor in $SO_2$ by known methods, or also $SO_2$ more or less free from foreign gases, as obtainable with particular advantage from initial gases poor in $SO_2$ by the absorption processes utilising mixtures of organic bases, such as toluidines or xylidines, with water as absorption agent and described, for example, in United States Patent No. 1,893,385 and in the application of Conway von Girsewald, Hans Weidmann and Gerhard Roesner, Serial No. 720,654 and Serial No. 60,532, filed April 14, 1934, and January 23, 1936, respectively, and the German Patent No. 623,018.

When gas mixtures are used which contain, in addition to sulphur dioxide, a certain quantity of oxygen, for example in the form of air or of air enriched with oxygen, the heat disengaged by the combustion of carbon with the oxygen in the layer of coal may be sufficient to maintain the temperature of conversion in the combustion zone. When use is made of gases which do not contain a quantity of oxygen sufficient for this purpose, and also in particular when pure sulphur dioxide is used, provision must be made for the supply of additional heat by the gas. This may be done either by preheating the gas in accordance with the existing requirement of heat before entry into the reducing chamber, which may for example be effected by an exchange of heat with the outgoing gases of the reducing process, or it may be carried out by the addition of oxygen, for example in the form of air or of air enriched with oxygen, to the gas, before the introduction of the latter into the reducing furnace, in such a quantity that the heat lacking is produced by the combustion of the quantity of carbon corresponding to the oxygen present. It is also possible to obtain the necessary supply of heat by the two means mentioned simultaneously. In any case, however, the quantity of heat to be expended by the additional combustion of oxygen is considerably smaller when working in accordance with the present invention than in the case of the known processes aiming at the predominant oxidation of the carbon to carbon monoxide.

A gas mixture containing sulphur dioxide or pure sulphur dioxide may be passed through a layer of coke contained in a shaft furnace and previously heated for instance, by hot blasting with air to a temperature sufficient for starting the reduction of the $SO_2$. The layer of coke should have such a height that the composition of the gas emerging from the same is not affected by unavoidable periodical changes in its height. The original gas mixture is led through the layer of coke at such a speed in proportion to the height of the layer of coke that the emerging gas is practically free from $SO_2$ and its temperature at the place of discharge from the layer of coke does not exceed 800° C. Supplying of additional heat to the layer of coke, if necessary, may be taken care of by the gas itself. When proceeding in this manner the ratio $$\frac{COS+CO}{CO_2}$$

in the gas passing off from the layer of coke is adjusted to a definite value dependent on the different working conditions involved in each instance.

The outgoing gas, which may also be conducted through a heat exchanging apparatus for the purpose of pre-heating the ingoing gas, is subjected to the secondary treatment, if desired after previous separation of the elementary sulphur already contained therein, in the presence of a catalyst, such as bauxite, for example at temperatures above the melting temperature of sulphur up to about 700° C., after the addition or with the constant addition of the quantity of $SO_2$ adjusted to the uniform COS content of the gas.

In consequence of the constantly uniform composition of the gas the necessity—so disturbing in the known processes—of immediately adjusting the quantity of $SO_2$ added to every small variation in the depth of the layer of coal or in the composition of the outgoing gas, is dispensed with in the subsequent addition of the sulphur dioxide or gas containing same required for the reaction with the sulphur-containing by-products and the carbon monoxide present in the gas. On the contrary, after once adjusting to the quantity of $SO_2$ to be added per unit of time that is found to be correct or advantageous, the continued uniform addition in the same quantitative proportion is sufficient, whereby a reliable and always uniform result is obtained while the operation of the plant is simplified to a very exceptional extent.

In this process it is particularly noteworthy and surprising that the composition of the outgoing gas from the reduction process, obtained when working in the foregoing manner, has been found by tests not to correspond to the equilibrium ascertained in the laboratory for the temperature range of the combustion zone when using external heating.

The present process affords, inter alia, the following advantages over known processes:

As compared with the processes aiming at the reduction of the oxygen present predominantly to carbon dioxide, the advantage of convenient and reliable operation in consequence of the invariability of the composition of the outgoing gas from the reducing furnace even in the case of the use of sulphur dioxide-containing initial gas having a varying sulphur dioxide content, and of the elimination of the necessity of constant adjustment of the quantity of $SO_2$ continually added to the composition of the outgoing gas from the reducing process which composition, in known processes, is a varying one. Further, as compared with the known processes aiming at the reduction of the oxygen present predominantly to carbon monoxide, the advantage of a smaller expenditure of heat and a smaller consumption of reducing coal and of a substantial reduction of the quantity of undesirable sulphur-containing by-products.

Further, as compared with processes aiming at the passage of the gas through the layer of fuel at such a speed that $SO_2$ still remains in the gas, the advantage of a reduction of the quantity of gas to be passed through the producer in consequence of the addition of the sulphur dioxide needed only after the reducing chamber. Further, for the same reason the advantage of the reduction of the quantity of the dust carried along by the outgoing gas from the reducing furnace, which dust is preferably extracted in suitable manner from the gas before the secondary treatment by means of catalysts. Further, as compared with known processes working with layers of fuel of small depth, the advantage that, in consequence of the greater height of the layer of fuel the latter is extensively preheated before it reaches the actual combustion zone. The result thereof is a corresponding lowering of the temperature of the gas issuing from the reducing chamber. This, in turn, eliminates the necessity of cooling this gas before its subsequent treatment with catalysts, which has to be carried out at a relatively low temperature.

*Example I*

0.72 normal cbm. of 100% sulphur dioxide gas, which had been preheated to about 350°–400° C. by exchange of heat with the outgoing gas of the producer, were fed per minute, in two parallel tests *a* and *b*, to a sulphur extraction plant consisting of a rotary grate producer of a diameter of 50 cm. provided with coke charging equipment and the following apparatus connected thereafter in series: catalyst chamber filled with ferruginous roasted pyrites, heat exchanger and sulphur condenser. In the producer the gas traversed an incandescent layer of coke from bottom to top and was reduced at temperatures between 900° and 1200° C. The reduction gas then passed into the catalyst, where the products formed in side reactions, mainly carbon oxysulphide and carbon monoxide, were converted into elementary sulphur in vapour form and carbon dioxide, at a temperature between 600° and 700° C. by sulphur dioxide still present (Test *a*) and by added sulphur dioxide (Test *b*). In the heat exchanger connected thereafter the gas was cooled to 300° C. the heat being utilised to heat up the gas supplied to the producer. From the heat exchanger the sulphur-containing gas passed into the condenser, where the sulphur was condensed in liquid form.

*Test (a).*—The depth of the layer of coke overlying a 20 cm. layer of slag was 35 cm. Every thirty minutes 20 kilos of coke were added to the producer to replace the quantity burnt. The reduction gas leaving the producer at a temperature of from 800° to 880° C. contained still unreduced sulphur dioxide, apart from carbon dioxide, carbon oxysulphide and carbon monoxide. The following table shows, for intervals of time of 5 minutes, the composition of the reduction gas issuing from the producer (column headed "producer outlet") and that issuing from the catalyst chamber (column headed "catalyst outlet"):

In view of the considerable fluctuations in the

| Minutes after charging coke | $CO_2$, percent | COS, percent | CO, percent | $SO_2$, percent |
|---|---|---|---|---|
| 5 Producer outlet | 76.0 | 15.4 | 4.4 | 3.5 |
| Catalyst outlet | 88.5 | 9.9 | 1.3 | 0 |
| 15 Producer outlet | 78.6 | 11.3 | 2.8 | 7.1 |
| Catalyst outlet | 97.2 | 1.2 | 0 | 0.9 |
| 20 Producer outlet | 78.1 | 9.3 | 2.1 | 10.2 |
| Catalyst outlet | 94.4 | 0.44 | 0 | 5.4 |
| 25 Producer outlet | 74.4 | 8.5 | 0 | 15.1 |
| Catalyst outlet | 89.5 | 0.3 | 0 | 10.2 |
| 5 min. after next charge of coke: Producer outlet | 75.2 | 13.7 | 5.4 | 5.7 |
| Catalyst outlet | 89.8 | 8.7 | 0.8 | 0.7 | composition of the reduction gas, apparent from the above table, particularly on each recharging with coke, it was not possible to apportion the quantity of sulphur dioxide required for the reaction in the catalyst chamber. The final gas therefore always contained considerable and varying quantities of non-condensable sulphur compounds, at times carbon oxysulphide and at others sulphur dioxide.

*Test (b).*—Under otherwise identical conditions, the depth of the layer of coke overlying the layer of slag was increased to 50, 90 and 140 cm. The reduction gas left the producer at a temperature of 650°–750° C., was practically free from sulphur dioxide and contained always the same percentage of COS+CO, independently of the burning away and refilling with coke, i. e. of the variations in the depth of the layer of coke. Before entry into the catalyst chamber the necessary quantity of sulphur dioxide for the conversion of the carbon oxysulphide and carbon monoxide was admixed with the reduction gas, namely about 0.01 normal cbm. of sulphur dioxide per minute. The following table shows the composition of the gas at the outlets from the producer and catalyst chamber:

| Layer of coke, cm. | $CO_2$, percent | COS, percent | CO, percent | $SO_2$, percent | COS+CO, percent | $\frac{COS+CO}{CO_2}$ |
|---|---|---|---|---|---|---|
| 50 Producer outlet | 74.5 | 19.8 | 4.9 | 0.8 | 24.7 | 0.33 |
| Catalyst outlet | 98.4 | 0.5 | 0 | 1.1 | | |
| 90 Producer outlet | 75.0 | 18.1 | 6.9 | 0 | 25.1 | 0.34 |
| Catalyst outlet | 97.9 | 1.3 | 0 | 0.8 | | |
| 140 Producer outlet | 73.5 | 18.6 | 7.1 | 0.4 | 25.7 | 0.35 |
| Catalyst outlet | 98.9 | 0.4 | 0 | 0.7 | | |

Whereas in Test (*a*) the non-condensable sulphur compounds contained in the final gas varied between 9.9% by volume and 0.3% by volume of COS, and 0% by volume and 10.2% by volume of $SO_2$, the method of working in accordance with Test (*b*) made it possible to obtain a final gas having only a very small content of non-condensable sulphur compounds.

*Example II*

Under otherwise identical conditions as in Example I, Test (*b*), 1.4 normal cbm. of a gas consisting of 50% $SO_2$ and 50% air were subjected per minute to the reducing process with layers of coke of different depths, without preheating. Above a height of the layer of coke of 40 cm. there was produced a reduction gas which, independently of further increasing of the depth of the layer of coke up to 2 metres, also had a constant content of COS+CO. The total of the COS+CO present in the gas amounted in all cases to about 22 parts to about 41 parts by volume of $CO_2$. The factor $$\frac{COS+CO}{CO_2}$$

thus amounted to 0.54 as compared with 0.33 in Example I, Test (*b*). Here again it was possible to obtain, by introducing fresh $SO_2$ into the catalyst, in constant operation, a final gas in which the total of $SO_2$+COS did not exceed 2% by volume.

We claim:
1. Process for recovering elemental sulphur from a gas containing $SO_2$ which comprises establishing, in a shaft furnace operated as a generator without external heating, a body of coke forming in said furnace a layer thereof in excess of 40 cm. in thickness; heating the coke to incandescence; passing through the layer of heated coke a stream of the gas containing $SO_2$; regulating the rate of flow of said stream of gas, with respect to the thickness of the layer of coke so that a temperature of at least about 900° C. is maintained in the main reaction zone formed within the body of coke, and so that the gas emerges from the body of coke at a temperature below 800° C. and simultaneously maintaining the layer thickness of the body of coke by the addition of coke to said body as coke is consumed, whereby a mixed gas having a constant ratio of COS plus CO to $CO_2$ is produced; adding $SO_2$ to the so-treated gas in quantity sufficient to convert the sulphur present therein in combined form into elemental form and to convert the CO content of the gas to $CO_2$; and contacting the resulting gas mixture with a heated catalyst adapted to promote said conversions of combined to elemental sulphur and of said CO to $CO_2$.

2. Process as defined in claim 1 in which sufficient oxygen is contacted with the coke together with the gas containing $SO_2$ to maintain the desired temperature of the coke.

CONWAY BARON v. GIRSEWALD.
GERHARD ROESNER.
JOSEF BARWASSER.